United States Patent
Akamastu et al.

[11] Patent Number: 5,885,741
[45] Date of Patent: Mar. 23, 1999

[54] CARRIER FOR ELECTROSTATIC LATENT IMAGE DEVELOPMENT AND COATING AGENT FOR USE THEREIN

[75] Inventors: Shoji Akamastu; Takao Amemiya, both of Chiba Prefecture, Japan

[73] Assignee: Dow Corning Toray Silicone Co., Ltd., Tokyo, Japan

[21] Appl. No.: 956,535

[22] Filed: Oct. 23, 1997

Related U.S. Application Data

[62] Division of Ser. No. 748,319, Nov. 13, 1996, abandoned.

[30] Foreign Application Priority Data

Nov. 27, 1995  [JP]  Japan ................... 7-331046

[51] Int. Cl.$^6$ ................................. G03G 9/107
[52] U.S. Cl. ........................ 430/106.6; 430/108
[58] Field of Search .................. 430/106.6, 108, 430/137; 428/405

[56] References Cited

U.S. PATENT DOCUMENTS

| | | | |
|---|---|---|---|
| 3,887,514 | 6/1975 | Merrill | 260/33.6 |
| 4,732,787 | 3/1988 | Vantillard et al. | 427/386 |
| 4,977,054 | 12/1990 | Honjo et al. | 430/108 |
| 5,085,964 | 2/1992 | Kawata et al. | 430/106.6 |
| 5,314,947 | 5/1994 | Sawaragi | 524/780 |
| 5,342,721 | 8/1994 | Akamatsu | 430/108 |
| 5,367,019 | 11/1994 | Sawaragi | 524/780 |
| 5,514,509 | 5/1996 | Kawata et al. | 430/108 |
| 5,567,561 | 10/1996 | Yoshikawa et al. | 430/108 |

FOREIGN PATENT DOCUMENTS 0 614 957 A1   9/1994   European Pat. Off. ...... C09D 183/06

*Primary Examiner*—John Goodrow
*Attorney, Agent, or Firm*—Sharon K. Severance

[57] ABSTRACT

A coating agent for a carrier for electrostatic latent image development comprised of (A) an organopolysiloxane having the formula $(R_3SiO_{1/2})_a(R_2SiO_{2/2})_b(RSiO_{3/2})_c$, wherein R is a monovalent hydrocarbon group or an epoxy-functional monovalent organic group, provided that the content of epoxy-functional monovalent organic groups relative to total R groups is 0.1 to 100 mol %, a is 0 or a positive number, b is a positive number, c is a positive number and a+b+c is 1; and (B) a curing agent.

A carrier for electrostatic latent image development comprised of an inorganic powder coated with the coating agent described above.

10 Claims, No Drawings

CARRIER FOR ELECTROSTATIC LATENT IMAGE DEVELOPMENT AND COATING AGENT FOR USE THEREIN

This application is a division of application Ser. No. 08/748,319 filed Nov. 13, 1996 which application is now abandoned.

BACKGROUND OF THE INVENTION

1. Field of the Invention

This invention relates to carriers for electrostatic latent image development and to coating agents for use in such carriers. More particularly, this invention relates to carriers for electrostatic latent image development which are relatively unaffected by humidity and to coating agents, for use in such carriers, that cure rapidly upon heating and upon cure, have electrification properties which are relatively unaffected by humidity.

2. Description of the Related Art

In electrophotography and electrostatic printing, an electrostatic latent image is formed on a photosensitive material. Then, a two-component dry developer is brought into close proximity to the electrostatic latent image such that the toner in the dry developer becomes attached to the electrostatic latent image. Next, the toner is transferred to a transfer sheet, after which the electrostatic latent image is developed by affixing the toner to the transfer sheet and heating.

This two-component dry developer is comprised of a toner and a carrier for electrostatic latent image development. The toner is comprised of a thermosetting resin and a colorant. The carrier is typically iron powder or glass powder. The toner is held onto the surface of the carrier by frictional electrification i.e. electrical charge. The surfaces of the carrier arc coated with a film of a peel able coating, such as silicone resin for the purpose of preventing film formation (spending) by the toner.

The silicone coating agents that have been used conventionally for coating the surfaces of carriers have included, for example, silicone resin compositions comprised of silanol-containing organopolysiloxanes (see Japanese Patent Application Early Disclosure No. 56-106968 (1981), silicone resin compositions containing organopolysiloxanes, comprised of bifunctional siloxane units and trifunctional siloxane units, and organotin compounds (see Japanese Patent Application Early Disclosure No. 61-284775 (1986), and silicone resin compositions comprised of methylphenyl silicone resin in which the ratio of silicon atoms bonded organic groups to silicon atoms is i.5 and less (see Japanese Patent Application Early Disclosure No. 2-160259 (1990).

However, because these coating agents are cured by condensation reactions of the silanol groups, there has been the problem that cure does not occur sufficiently if they are not heated for a long time at a high temperature, for example 200° to 250° C. Further, because unreacted silanol groups remain locally in the cured film that is obtained by curing the coating agent, there have been problems with variations in the electrostatic properties of the carrier that is obtained depending upon curing conditions and that electrification properties vary greatly depending on humidity.

The inventors first proposed a coating agent for carriers for electrostatic latent image development comprised of organopolysiloxanes that were composed of bifunctional siloxane units having aminoalkyl groups and trifunctional siloxane units and organopolysiloxanes that were composed of bifunctional siloxane units having monovalent organic groups containing haloalkyl groups or epoxy groups and trifunctional siloxane units (see Japanese Patent Application Early Disclosure No. 5-88413 (1993).

However, these coating agents are cured by reactions between the aminoalkyl groups and the monovalent organic groups containing haloalkyl groups or epoxy groups. For this reason, there are the problems that the cured films that are obtained are generally brittle and lacking in durability.

In particular, salts remain as by-products in the cured films that are obtained via the reaction between the organopolysiloxanes having aminoalkyl groups and the organopolysiloxanes having haloalkyl groups. Because of this, the mechanical properties of the cured film are poor and electrification properties vary greatly with changes in humidity.

The inventors conducted intensive research for the purpose of solving the aforementioned problems. As a result, they arrived at this invention.

Specifically, The objective of this invention is to provide a coating agent for carriers for electrostatic latent image development that is cured rapidly by heating and that forms a cured film having electrification properties that are relatively unaffected by humidity and to provide a carrier for electrostatic latent image development having electrification properties which are relatively unaffected by humidity.

SUMMARY OF INVENTION

The coating agent for carriers for electrostatic latent image development of this invention is characterized in that it is comprised of (A) 100 parts by weight of organopolysiloxane having the average unit formula:

wherein each R is individually selected from the group consisting of monovalent hydrocarbon groups and epoxy-functional monovalent organic groups, provided that the content of epoxy-functional monovalent organic groups relative to total R groups is 0.1 to 100 mol %, a >0, b >0, c>0,a+b+c=1; and (B) 0.01 to 100 parts by weight of a curing agent.

The carrier for electrostatic latent image formation of this invention is characterized in that it is comprised of an inorganic powder that is coated by the aforementioned coating agent.

DETAILED DESCRIPTION OF THE INVENTION

THE COATING AGENT
The Organopolysiloxane—Component (A)

Component (A) is the principal component of the coating agent of the present invention. It is used for the purpose of improving the curing characteristics of the composition, for improving the mechanical properties and electrification properties of the cured film that is obtained and for conferring durable heat resistance, peelability and smoothness. Component (A) is an organopolysiloxane having the average unit formula:

In the foregoing formula, each R is individually selected from the group consisting of monovalent hydrocarbon groups and epoxy-functional monovalent organic groups. The content of epoxy-functional monovalent organic groups present in component (A) relative to total R groups present in component (A) is 0.1 to 100 mol %, a is 0 or a positive number indicating the content of monofunctional siloxane units (M units), b is a positive number indicating the content of bifunctional siloxane units (D units) and c is a positive number indicating the content of trifunctional siloxane units (T units). The total of a, b and c is 1.

Component (A), as represented by the aforementioned average unit formula is a DT type organopolysiloxane, comprised of bifunctional siloxane units (D units) and trifunctional siloxane units (T units), or an MDT type organopolysiloxane, comprised of bifunctional siloxane units, trifunctional siloxane units and monofunctional siloxane units (M units). Component (A) does not have tetrafunctional units (Q units). The reason for this is that the mechanical properties of the cured film that is obtained are diminished when a DTQ type organopolysiloxane or an MDTQ organopolysiloxane having tetrafunctional siloxane units is used.

In the foregoing formula each R is individually selected from the group consisting of monovalent hydrocarbon groups and epoxy-functional monovalent organic groups. Monovalent hydrocarbon groups of the present invention include, for example, alkyl groups, such as methyl groups, ethyl groups, propyl groups, butyl groups, pentyl groups, hexyl groups and heptyl groups; alkenyl groups, such as vinyl groups, allyl groups, butenyl groups, pentenyl groups and hexenyl groups; aryl groups, such as phenyl groups, tolyl groups, xylyl groups and naphthyl groups: aralkyl groups, such as benzyl groups and phenethyl groups; and halogenated alkyl groups, such as chloromethyl groups, 3-chloropropyl groups, 3,3,3-trifluoropropyl groups and nonafluorobutylethyl groups. Methyl groups and phenyl groups are particularly desirable monovalent hydrocarbon groups.

Epoxy-functional monovalent organic groups of the present invention include, for example, epoxyalkyl groups, such as 2,3-epoxypropyl groups, 3,4-epoxybutyl groups and 4,5-epoxypentyl groups; glycidoxyalkyl groups such as 2-glycidoxyethyl groups, 3-glycidoxypropyl groups and 4-glycidoxybutyl groups; and (3,4-epoxycyclohexyl) alkyl groups such as 2-(3,4-epoxycyclohexyl) ethyl groups and $3$-(3,4-epoxycyclohexyl) propyl groups. Glycidoxyalkyl groups and (3,$^4$-epoxycyclohexyl) alkyl groups are particularly desirable.

The content of epoxy-functional monovalent organic groups relative to total R groups should be 0.1 to 100 mol %, and, preferably, 5 to 100 mol %. When the content of epoxy-functional monovalent organic groups relative to total R groups is less than 0.1 mol %, the mechanical properties of the cured film that is obtained are markedly diminished.

Component (A) is a liquid at room temperature or a solid that has a softening point above room temperature. When component (A) is a solid, its softening point is preferably 50° to 200° C. In preferred embodiments, component (A) in this invention is an organopolysiloxane having a softening point above room temperature. It is preferable that a =0, 0.05 <b <0.7, 0.3 <c <0.95 and b+c =1. When component (A) has a high content of phenyl groups, it is a solid substance having a softening point above room temperature, for which reason it is desirable that the content of epoxy-functional monovalent organic groups relative to total R groups should be 0.1 to 20 mol % and the phenyl group content should be 60 to 90 mol %. More preferably, the content of epoxy-functional monovalent organic groups should be 5 to 20 mol % and the phenyl group content should be 60 to 90 mol %. The preferred R groups are epoxy-functional monovalent organic groups, methyl groups and phenyl groups.

In addition, small quantities of alkoxy groups such as methoxy groups, ethoxy groups, propoxy groups and butoxy groups or hydroxyl groups may also be bonded to the silicon atoms of component (A) as long as the objectives of the invention are not impeded.

Methods for manufacturing the organopolysiloxane comprising component (A) include, for example, a method in which a dialkoxysilane having epoxy-functional monovalent organic groups is subjected to a re-equilibration reaction in the presence of an acid catalyst or an alkali catalyst with an organopolysiloxane obtained by hydrolysis and condensation of an organotrichlorosilane, a method in which a dialkoxysilane or a trialkoxysilane having an epoxy-functional monovalent organic group is subjected to a re-equilibration reaction in the presence of an acid catalyst or an alkali catalyst with an organopolysiloxane obtained by hydrolysis and condensation of an organotrichlorosiloxane and a diorganodichlorosilane, and, as required, a triorganopolysiloxane and a method in which a dialkoxysilane or a trialkoxysilane having an epoxy-functional monovalent organic group is subjected to a condensation reaction in the presence of an acid catalyst, an alkali catalyst or an organic metal compound catalyst with an organopolysiloxane comprised of bifunctional siloxane units and trifunctional siloxane units having hydroxyl groups or alkoxy groups that are bonded to silicon atoms.

The Curing Agent—Component (B)

The curing agent comprising component (B) of the present invention is a component that reacts with the epoxy-functional monovalent organic group of component (A) for the purpose of curing the composition. Component (B) may be a crosslinking agent or a curing catalyst. When component (B) is a crosslinking agent, it may be, for example, a phenol compound; a carboxylic acid compound; an aliphatic anhydride, such as dodecenylsuccinic anhydride, polyadipic anhydride, polyazelaic anhydride and polysebacic anhydride; an alicyclic anhydride such as methyltetrahydrophthalic anhydride, methylhexahydrophthalic anhydride, methythimic anhydride, hexahydrophthalic anhydride, 4methylhexahydrophthalic anhydride and tetrahydrophthalic acid; aromatic anhydrides, such as phthalic anhydride, trimellitic anhydride, pryromellitic anhydride, benzophenonetetracarboxylic anhydride, amine compounds; aliphatic diamines, such as ethylenediamine, 1,3-diaminopropane, 1,4-diaminobutane, hexamethylenediamine and 2,5-dimethylhexamethylenediamine; aliphatic polyamine compounds, such as diethylenetriamine, iminobispropylamine, bis(hexamethylene)triamine, triethylenetetramine, tetraethylenepentamine, pentaethylenehexamine and tri(ethylamino)hexene, compounds containing alkoxy groups; partial reaction products of any of the above listed compounds; and mixtures thereof. The curing catalyst comprising component (B) may be, for example, tertiary amine compounds, such as tris (dimethylaminomethyl)phenol, dimethylbenzylamine, 1,8-diazabicyclo (5,4,0) undecane and 1,8diazabicyclo (5,4,0) undecene; quaternary ammonium salts, such as tetramethylammonium bromide; imidazole compounds, such as 2-methylimidazole, 2-thyl-4-methylimidazole and 2-phenylimidazole; phenol resins; urea resins; melamine resins; isocyanates; block isocyanates; phosphorus compounds, such as triphenylphosphine; aluminum compounds, such as organoaluminums; and zirconium compounds, such as organozirconiums. The crosslinking agents and curing catalysts comprising component (B) may be used individually or the crosslinking agents and curing catalysts may be used in combination.

In compositions of the present invention, component (B) is present in an amount ranging from 0.01 to 100 parts by weight per 100 parts by weight of component (A). Compositions containing less than 0.01 parts by weight of component (B) do not readily undergo a curing reaction. Compositions containing more than 100 parts by weight of component (B) also does not readily undergo a curing reaction.

As long as the objective of the invention is not impeded, other optional components can be compounded with this composition, including, for example, fillers such as aerosol silica, crystalline silica, sintered silica, wet silica, titanium oxide, zinc carbonate, calcium carbonate, iron oxide and carbon black, higher aliphatic acid esters or metal salts, ester waxes or plasticizers such as stearic acid esters and palmitic acid esters, aromatic solvents such as toluene and xylene, aliphatic solvents such as hexane and heptane, ketone solvents such as acetone and methyl ethyl ketone and organic solvents such as tetrahydrofuran and dioxane. When these organic solvents are compounded, carriers for electrostatic latent image development can be manufactured by the immersion method, the spray coating method and the fluidized bed method.

The cure mechanism of this composition differs from that of conventional coating agents that are cured by condensation reactions of silanol groups in that there are no localized, residual silanol groups left as a result of the curing reaction, for which reason the electrification properties of the carrier for electrostatic latent image development that is coated with the cured film is not readily affected by humidity.

CARRIER FOR ELECTROSTATIC LATENT IMAGE DEVELOPMENT

We shall now present a detailed description of the carrier for electrostatic latent image development of this invention.

The Inorganic Powder—Component 1

The inorganic powder which is the principal component of this carrier includes, for example, magnetic powders such as iron, nickel, cobalt, ferrite and magnetite, tin oxide, silver, steel, bronze, carborundum, glass beads, graphite, carbon black, molybdenum sulfide, aluminum and silicon dioxide. The average particle diameter of these inorganic powders should be, for example, 30 to 1,000 Em, and, preferably, 50 to 500 $\mu$m.

The Coating Agent—Component 2

Component 2 of the present invention is the coating agent described above.

The carrier of the present invention can be manufactured by the following method. The inorganic powder is heated. The coating agent is mixed with the inorganic powder as it is being heated. During the mixing process, the coating agent coats the surfaces of the particles of the inorganic powder. The coating agent is then cured. The quantity of the coating agent that is mixed with the inorganic powder can be calculated by determining the surface area of the inorganic powder and the thickness of the film to be coated on the inorganic powder. The amount of coating agent added should be a quantity sufficient to coat the inorganic powder. The thickness of the coating agent that is formed on the surface of the inorganic powder should be, for example, 0.1 to 50 $\mu$m. The conditions under which mixing of the inorganic powder and coating agent is to occur should be such that the coating agent with which the surface of the inorganic powder has been coated can undergo a sufficient curing reaction to form a cured film exhibiting mechanical strength. For example, when the temperature at which the coating agent and inorganic powder are mixed is greater than 100° C., mixing time should be 0.5 to 15 hours. In this case, the equipment for preparing the carrier for electrostatic latent image development can be, for example, a "Ross" mixer, a kneader mixer or a henshel mixer. "Ross" is a registered trademark of Charles Ross & Son Company of Hauppauge, N.Y.

EXAMPLES

We shall now present detailed descriptions of the coating agents and carriers for electrostatic latent image development of the present invention. Viscosity in the examples is the value determined at 25° C. The softening points of the organopolysiloxanes were determined with a precision melting point determination device manufactured by the Shibata Science (Shibata Kagaku) Company. The quantity of electrification of the carriers for electrostatic latent image development were determined as follows:

Determination of quantity of electrification 30 g of carrier for electrostatic latent image development and 1 g of carbon black toner particles were shaken for 10 minutes with a shaker, after which the quantity of electrification of the carrier after 30 seconds of blow-off was determined by a blow-off powder electrification determination device manufactured by the Toshiba Chemical Company. This carrier was allowed to stand for 24 hours in an oven at a temperature of 50° C and a humidity of 90%, after which the quantity of electrification of the carrier was determined in the same way as described above.

Reference Example 1

100 g of water, 100 g of isopropyl alcohol and 400 g of toluene were introduced into a 3 L round-bottom flask equipped with a stirrer, a thermometer and a dropping funnel. A mixed solution of 297 g (approximately 1.4 moles) of phenyltrichlorosilane, 76 g (approximately 0.3 moles) of diphenyldichlorosilane and 39 g (approximately 0.3 moles) of dimethyldichlorosilane was added to the system dropwise gradually over a period of 1 hour as the materials were being stirred. The system was then subjected to heating and reflux for 2 hours and allowed to cool. The water of the bottom layer of the system was removed, 600 g of an aqueous solution of sodium hydrogen carbonate of a concentration of 10% was introduced into the system and the materials were stirred for 30 minutes, after which the water of the bottom layer of the system was removed. The system was then washed 3 times with water, the toluene and water were removed from the toluene solution that was obtained and organopolysiloxane was prepared at 150° C. to approximately 50 wt %. The viscosity of a toluene solution of this organopolysiloxane was 6 mPa.s (centipoise).

Next, 25 g of 3-glycidoxypropylmethyldimethoxysilane was introduced into 500 g of a toluene solution of this organopolysiloxane, the system was stirred for 5 hours at toluene reflux temperature and a toluene solution of organopolysiloxane having 3-glycidoxypropyl groups was prepared. Next, some of this toluene solution was heated under reduced pressure and solid organopolysiloxane having 3-glycidoxypropyl groups was prepared. The softening point of this organopolysiloxane was 75° C. This organopolysiloxane was analyzed by nuclear magnetic resonance spectroscopy and it was confirmed that it was an organopolysiloxane as indicated by the following average unit formula.

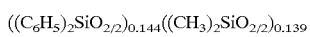

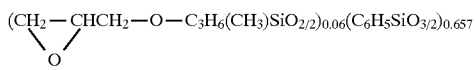

Reference Example 2

450 g of water and 900 g of toluene were introduced into a 3 L round-bottom flask equipped with a stirrer, a thermometer and a dropping funnel. 422 g (approximately 2 moles) of phenyltrichlorosilane was added dropwise gradually over a period of 1 hour to the system as the materials were being stirred. The system was then stirred for 1 hour at 60° to 70° C., after which the water of the bottom layer of the system was removed. One liter of water was added to the system and it was stirred, after which it was allowed to stand, the water of the bottom layer was removed and most of the hydrochloric acid was removed: 10 g of sodium hydrogen carbonate and 1 liter of water were introduced into the system and it was stirred for 30 minutes, after which the water of the bottom layer of the system was removed. The system was then washed 3 times with water, the toluene and water were removed from the toluene solution that was obtained and organopolysiloxane was prepared at 150° C. to approximately 30 wt %.

Next, 44 g (approximately 0.2 moles) of 3-glycidoxypropylmethyldimethoxysilane, 1 g of a 10% aqueous solution of sodium hydroxide and 15 g of dimethylformamide were introduced into 900 g (approximately 0.2 moles) of a toluene solution of this organopolysiloxane and the materials were heated. Next, the system was heated to remove toluene containing condensed water and organopolysiloxane was prepared at 150° C. to approximately 60 wt %, after which the system was stirred for three hours and an equilibration reaction was effected. Acetic acid was then introduced into the system, after which the salt that was produced was filtered. Some of the toluene solution of this organopolysiloxane was heated under reduced pressure and organopolysiloxane having 3-glycidoxypropyl groups that was in a solid state at room temperature was prepared. The softening point of this organopolysiloxane was 55° C. This organopolysiloxane was analyzed by nuclear magnetic resonance spectroscopy and it was confirmed that it was an organopolysiloxane as indicated by the following average unit formula.

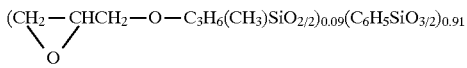

Example 1

200 g of a 50 wt % toluene solution of the organopolysiloxane having 3-glycidoxypropyl groups that was prepared in Reference Example 1.11 g of 4-methylhexahydrophthalic anhydride and 0.4 g of 1,8-diazabicyclo (5,4,0) undecene were mixed uniformly and a coating agent was prepared.

20 g of coating agent and 1 kg of ferrite powder of an average particle diameter of 100 μm were mixed for 10 minutes at room temperature using a kneader mixer, after which the materials were heated and mixed for I hour at 150° C and a carrier was prepared. The fluidity of this carrier was excellent.

When the quantity of electrification of this carrier was determined after 30 seconds of blow-off, it was determined to be 25 μC/g. Thus, it was confirmed that this carrier was suitable for use in electrostatic latent image development. When the quantity of electrification of this carrier was determined after this carrier was subjected to moisture resistance tests, it was found to be 24 μC/g. Thus it was confirmed that the electrification properties of this carrier are not affected by humidity.

Example 2

100 g of a 60 wt % toluene solution of the organopolysiloxane having 3-glycidoxypropyl groups that was prepared in Reference Example 2, 16 g of 4-methylhexahydrophthalic anhydride and 0.5 g of 1,8-diazabicyclo (5,4,0) undecene were mixed uniformly and a coating agent was prepared.

10 g of coating agent and 1 kg of ferrite powder of an average particle diameter of 100 μm were mixed for 10 minutes at room temperature using a kneader mixer, after which the materials were heated and mixed for 1 hour at 150° C and a carrier was prepared. The fluidity of this carrier was excellent.

When the quantity of electrification of this carrier was determined after 30 seconds of blow-off, it was determined to be 22 μC/g. Thus, it was confirmed that this carrier was suitable for use in electrostatic latent image development. When the quantity of electrification of this carrier was determined after this carrier was subjected to moisture resistance tests, it was found to be 21 μC/g. Thus it was confirmed that the electrification properties of this carrier are not affected by humidity.

Comparative Example 1

A silicone composition that cures via a condensation reaction comprised of an organopolysiloxane (silanol group content =0.5 wt %) as indicated by the average unit formula:

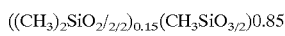

and dibutyl tin diacetate was diluted with toluene and a 50 wt % toluene solution was prepared. This solution was used as the coating agent.

20 g of this coating agent and 1 kg of ferrite powder of an average particle diameter of 100 μm were mixed for 10 minutes at room temperature using a kneader mixer, after which the materials were heated and mixed for 1 hour at 150° C. and a carrier was prepared. The fluidity of this carrier was excellent.

When the quantity of electrification of this carrier was determined after 30 seconds of blow-off, it was determined to be 30 μC/g. Thus, it was confirmed that this carrier was suitable for use in electrostatic latent image development. When the quantity of electrification of this carrier was determined after this carrier was subjected to moisture resistance tests, it was found to be 25 μC/g. Thus it was confirmed that the electrification properties of this carrier were markedly changed by humidity.

Comparative Example 2

An organopolysiloxane (silanol group content =1.0 wt %) as indicated by the average unit formula:

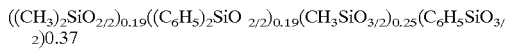

was diluted with toluene and a 50 wt % toluene solution was prepared. This solution was used as the coating agent.

20 g of this coating agent and 1 kg of ferrite powder of an average particle diameter of 100 μm were mixed for 10 minutes at room temperature using a kneader mixer, after which the materials were heated and mixed for 1 hour at 150° C and a carrier was prepared. The fluidity of this carrier was excellent.

When the quantity of electrification of this carrier was determined after 30 seconds of blow-off, it was determined to be 26 μC/g. Thus, it was confirmed that this carrier was suitable for use in electrostatic latent image development.

When the quantity of electrification of this carrier was determined after this carrier was subjected to moisture resistance tests, it was found to be 19 μC/g. Thus it was confirmed that the electrification properties of this carrier were markedly changed by humidity.

TABLE 1

| Item | Group | | | |
|---|---|---|---|---|
| Quantity of electrification (μC/g) | This invention | | Comparative Examples | |
| | Example 1 | Example 2 | Comparative Example 1 | Comparative Example 2 |
| Initial Period | 25 | 22 | 30 | 26 |
| After moisture resistance tests | 24 | 21 | 25 | 19 |

Effect of the invention

The coating agent for carriers for electrostatic latent image development of this invention is characterized in that it is cured rapidly by heating and that it forms a cured film the electrification characteristics of which are little affected by humidity. Further, the carrier for electrostatic latent image development of this invention is characterized in that its electrification characteristics are little affected by humidity.

That which is claimed is:

1. A carrier for electrostatic latent image development, comprising:
   1) an inorganic powder, and
   2) a coating agent comprising:
      A) 100 parts by weight of an organopolysiloxane having an average unit formula:

$(R_3SiO_{1/2})_a(R_2SiO_{2/2})_b(RSiO_{3/2})_c$ wherein each R is individually selected from the group consisting of monovalent hydrocarbon groups and epoxy-functional monovalent organic groups, having a content of epoxy-functional monovalent organic groups relative to total content of R groups of 0.1 to 100 mol %, $a \geq 0$, $b>0$, $c>0$, and $a+b+c=1$; and
      B) 0.01 to 100 parts by weight of a curing agent.

2. The carrier according to claim 1 wherein the inorganic powder is selected from the group consisting of magnetic powders, tin oxide, silver, steel, bronze, carborundum, glass beads, graphite, carbon black, molybdenum sulfide, aluminum and silicon dioxide.

3. The carrier according to claim 2 wherein the magnetic powders are selected from in the group consisting of iron, nickel, cobalt, ferrite and magnetite.

4. The carrier according to claim 2 wherein the inorganic powder has an average particle diameter of 30 to 1,000 μm.

5. The carrier according to claim 4 wherein the inorganic powder has an average particle diameter of 50 to 500 μm.

6. The carrier according to claim 1 wherein the inorganic powder is coated with the coating agent.

7. The carrier of claim 1, wherein the curing agent is selected from the group consisting of crosslinking agents, curing catalysts, and combinations thereof.

8. The carrier of claim 7, wherein the crosslinking agent is a compound selected from the group consisting of phenol compounds, carboxylic acid compounds, aliphatic anhydrides, alicyclic anhydrides, aromatic anhydrides, amine compounds, aliphatic diamines, aliphatic polyamine compounds, compounds containing alkoxy groups, partial reaction products of the compounds, and mixtures thereof.

9. The carrier of claim 7, wherein the curing catalyst is a compound selected from the group consisting of tertiary amine compounds, quaternary ammonium salts, imidazole compounds, phenol resins, urea resins, melamine resins, isocyanates, block isocyanates, phosphorous compounds, aluminum compounds, and zirconium compounds, and combinations thereof.

10. A carrier for electrostatic latent image development prepared by a method comprising:
   1) coating a coating agent on an inorganic powder, and
   2) heating the coating agent, wherein the coating agent comprises:
      A) 100 parts by weight of an organopolysiloxane having an average unit formula:

$(R_3SiO_{1/2})_a(R_2SiO_{2/2})_b(RSiO_{3/2})_c$ wherein each R is individually selected from the group consisting of monovalent hydrocarbon groups and epoxy-functional monovalent organic groups, having a content of epoxy-functional monovalent organic groups relative to total content of R groups of 0.1 to 100 mol %, $a \geq 0$, $b>0$, $c>0$, and $a+b+c=1$; and
      B) 0.01 to 100 parts by weight of a curing agent.

* * * * *